(12) United States Patent
Lin et al.

(10) Patent No.: US 10,580,206 B2
(45) Date of Patent: Mar. 3, 2020

(54) METHOD AND APPARATUS FOR CONSTRUCTING THREE-DIMENSIONAL MAP

(71) Applicant: BAIDU ONLINE NETWORK TECHNOLOGY (BEIJING) CO., LTD., Beijing (CN)

(72) Inventors: Yuan Lin, Beijing (CN); Sili Chen, Beijing (CN); Yuhua Dong, Beijing (CN); Binbin Zheng, Beijing (CN); Yijie Yan, Beijing (CN); Zhongqin Wu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/726,017

(22) Filed: Oct. 5, 2017

(65) Prior Publication Data
US 2018/0261005 A1    Sep. 13, 2018

(30) Foreign Application Priority Data

Mar. 7, 2017   (CN) .......................... 2017 1 0131578

(51) Int. Cl.
*G06T 17/05*    (2011.01)
*G06T 7/55*     (2017.01)
*G06T 17/00*    (2006.01)

(52) U.S. Cl.
CPC ............... *G06T 17/05* (2013.01); *G06T 7/55* (2017.01); *G06T 17/00* (2013.01); *G06T 2200/08* (2013.01); *G06T 2207/10004* (2013.01)

(58) Field of Classification Search
CPC .......... G05D 1/0274; G06T 7/55; G06T 17/00
See application file for complete search history.

(56) References Cited

U.S. PATENT DOCUMENTS

| | | | | | |
|---|---|---|---|---|---|
| 4,315,312 A | * | 2/1982 | Schmidt | .............. | G06F 12/0864 |
| | | | | | 711/172 |
| 4,875,165 A | * | 10/1989 | Fencil | ..................... | G06T 7/593 |
| | | | | | 345/424 |

(Continued)

FOREIGN PATENT DOCUMENTS

WO    WO-2016078728 A1    *    5/2016    ............. G06T 7/579

OTHER PUBLICATIONS

Folker Wientapper, Harald Wuest, Arjan Kuijper, "Reconstruction and Accurate Alignment of Feature Maps for Augmented Reality", 3D Imaging Modeling Processing Visualization and Transmission (3DIMPVT) 2011 International Conference on, pp. 140-147 (Year: 2011).*

(Continued)

*Primary Examiner* — William A Beutel
(74) *Attorney, Agent, or Firm* — Marshall, Gerstein & Borun LLP

(57) ABSTRACT

The present disclosure discloses a method and apparatus for constructing a three-dimensional map. A specific embodiment of the method includes: acquiring multiple frames of a monocular image containing a target object collected by a monocular camera, and constructing a three-dimensional map containing the target object and other objects in the monocular image based on the monocular image; determining an absolute scale of the target object, and determining a ratio of a relative scale corresponding to the target object to the absolute scale; and adjusting a scale of each object in the three-dimensional map to obtain a three-dimensional map meeting a preset condition based on the ratio. The method and apparatus provided by the present disclosure achieves the construction of a world coordinate system with absolute scales in a three-dimensional map constructed based on a monocular image.

9 Claims, 4 Drawing Sheets

(56) References Cited

U.S. PATENT DOCUMENTS

| | | | |
|---|---|---|---|
| 2013/0314413 A1* | 11/2013 | Coon | A61B 3/111 345/420 |
| 2016/0104314 A1* | 4/2016 | Nakazato | G06T 7/50 382/285 |
| 2016/0379080 A1* | 12/2016 | Yalniz | G06K 9/4609 382/164 |
| 2017/0337701 A1* | 11/2017 | Jovanovich | G06T 7/74 |
| 2018/0024562 A1* | 1/2018 | Bellaiche | G01S 19/48 701/26 |

OTHER PUBLICATIONS

Georg Klein, et al. "Parallel Tracking and Mapping for Small AR Workspaces", ISMAR '07 Proceedings of the 2007 6th IEEE and ACM International, Symposium on Mixed and Augmented Reality, pp. 1-10, Nov. 13-16, 2007 (Year: 2007).*

* cited by examiner

METHOD AND APPARATUS FOR CONSTRUCTING THREE-DIMENSIONAL MAP

CROSS-REFERENCE TO RELATED APPLICATION

This application is related to and claims the priority from Chinese Application No. 201710131578.4, filed on Mar. 7, 2017, entitled "Method and Apparatus for Constructing Three-dimensional Map," the entire disclosure of which is incorporated herein by reference.

TECHNICAL FIELD

The present disclosure relates to the field of computer technology, specifically to the field of map construction, and more specifically to a method and apparatus for constructing a three-dimensional map.

BACKGROUND

Three-dimensional map construction is the core technology for environment perception. For example, when adding an object to a augmented reality (AR) scene, it is necessary to acquire the true scale of the object from the three-dimensional map corresponding to the scene. At present, usually it is necessary to use specific equipment such as binocular cameras and depth cameras to construct a three-dimensional map in which each object corresponds to the true scale.

However, on commonly used terminals such as mobile phones and tablet PCs, only monocular cameras are provided. It is not possible to construct a three-dimensional map in which each object corresponds to the true scale.

SUMMARY

The present disclosure provides a method and apparatus for constructing a three-dimensional map, in order to solve the technical problem mentioned in the foregoing Background section.

In a first aspect, the present disclosure provides a method for constructing a three-dimensional map, comprising: acquiring multiple frames of a monocular image containing a target object collected by a monocular camera, and constructing a three-dimensional map containing the target object and other objects in the monocular image based on the monocular image, each object in the constructed three-dimensional map corresponding to a relative scale relative to a world coordinate system; determining an absolute scale of the target object, and determining a ratio of a relative scale corresponding to the target object to the absolute scale, the absolute scale being a scale of the target object in the world coordinate system; and adjusting a scale of each object in the three-dimensional map to obtain a three-dimensional map meeting a preset condition, based on the ratio of the relative scale corresponding to the target object to the absolute scale, the preset condition including: the each object in the three-dimensional map having an absolute scale.

In a second aspect, the present disclosure provides an apparatus for constructing a three-dimensional map, comprising: a construction unit, configured to acquire multiple frames of a monocular image containing a target object collected by a monocular camera, and construct a three-dimensional map containing the target object and other objects in the monocular image based on the monocular image, each object in the constructed three-dimensional map corresponding to a relative scale relative to a world coordinate system; a determining unit, configured to determine an absolute scale of the target object, and determine a ratio of the relative scale corresponding to the target object to the absolute scale, the absolute scale being a scale of the target object in the world coordinate system; and an adjusting unit, configured to adjust a scale of each object in the three-dimensional map to obtain a three-dimensional map meeting a preset condition, based on the ratio of the relative scale corresponding to the target object to the absolute scale, the preset condition including: the each object in the three-dimensional map having an absolute scale.

By acquiring multiple frames of a monocular image containing a target object collected by a monocular camera, constructing a three-dimensional map containing the target object and other objects in the monocular image based on the monocular image, each object in the constructed three-dimensional map corresponding to a relative scale relative to a world coordinate system, determining an absolute scale of the target object, and determining a ratio of the relative scale corresponding to the target object to the absolute scale, the absolute scale being a scale of the target object in the world coordinate system, and adjusting a scale of each object in the three-dimensional map to obtain a three-dimensional map meeting a preset condition, based on the ratio of the relative scale corresponding to the target object to the absolute scale, the preset condition including: the each object in the three-dimensional map having an absolute scale, the method and apparatus for constructing a three-dimensional map provided by the present disclosure achieves the construction of a world coordinate system with absolute scales in a three-dimensional map constructed based on a monocular image. During the construction process of the subsequent three-dimensional map, any new object with an actual scale may be constructed in the three-dimensional map. In this way, a commonly used terminal provided with only the monocular camera may rely on the three-dimensional map in which objects in the current environment all have absolute scales, to determine the absolute scales of the objects in the current environment and perform a more accurate environment perception.

BRIEF DESCRIPTION OF THE DRAWINGS

After reading detailed descriptions of non-limiting embodiments with reference to the following accompanying drawings, other features, objectives and advantages of the present invention will be more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
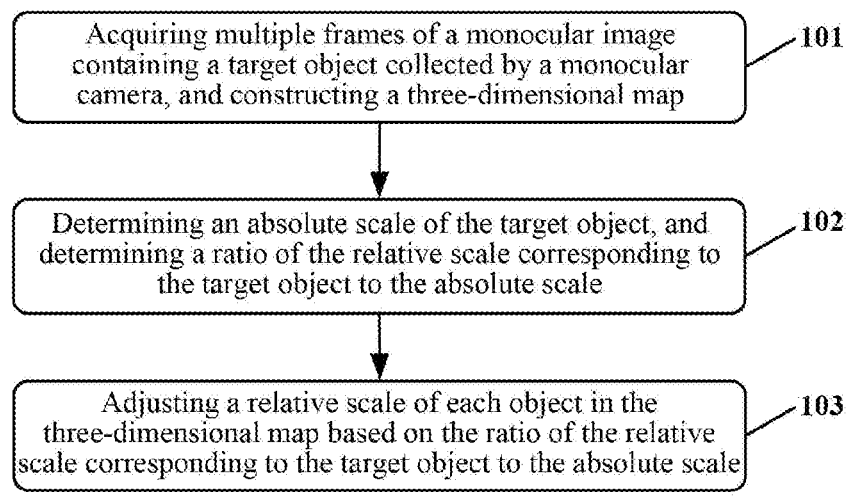
FIG. 1 shows a flow of an embodiment of a method for constructing a three-dimensional map according to the present disclosure.

Referring to FIG. 1, which shows a flow of an embodiment of a method for constructing a three-dimensional map according to the present disclosure. The method may be executed by a terminal and includes the following steps:

Step 101, acquiring multiple frames of a monocular image containing a target object collected by a monocular camera, and constructing a three-dimensional map.

In the present embodiment, a monocular camera may be provided on commonly used terminals such as mobile phones, monocular cameras on tablet PCs. When a user opens the monocular camera of a terminal, the monocular camera may collect an image corresponding to a scene within the range of the current viewing angle according to a preset collection frequency, i.e., the monocular image.

In the present embodiment, an object familiar in daily life such as a bus card, a bank card and a Coke bottle cap may be used as a target object. When the target object such as a bus card, a bank card and a Coke bottle appears in the scene within the range of the viewing angle of the monocular camera, the collected monocular image contains the target object.

In the present embodiment, multiple frames of the monocular image containing a target object collected by the monocular camera may correspond to different shooting angles. For example, the user may move the terminal to change the shooting angle of the monocular camera, so that the monocular camera may acquire multiple frames of the monocular image corresponding to different shooting angles, each of the frames of the monocular images having a parallax.

An absolute scale may refer to the scale of the target object in the world coordinate system, that is, the actual scale of the target object. The scale of the object includes but is not limited to: the scale of the object in the horizontal direction, the scale of the object in the vertical direction and the scale of the object in the depth direction. For example, if the target object is a rectangular bus card, the lengths of the long side and the short side of the bus card are respectively regarded as the scale of the bus card in the horizontal direction and the vertical direction.

In the present embodiment, the three-dimensional map may be initially constructed based on multiple frames of the monocular image using the SLAM (simultaneous localization and mapping)/VO (Visual Odometry) method. Currently, in a scene within the range of the viewing angle of the monocular camera, in addition to the target object, other objects are also included, accordingly, the image contains other objects in addition to the target object, and each object may be mapped to a corresponding location in the space by initially constructing the three-dimensional map adopting the SLAM/VO method. The process of initially constructing the three-dimensional map adopting the SLAM/VO method may be summarized as: selecting two frames of monocular images having certain parallax as the key frame images from the collected multiple frames of the monocular image, extracting characteristic points having characteristics of objects from the key frame images, and determining matching characteristic points in the two key frame images, at the same time, misplaced points may be eliminated by adopting the epipolar geometry method. The triangulation may be performed based on the matching characteristic points, to calculate the motion of the monocular camera and determine the locations of the characteristic points in the space, that is, to determine three-dimensional points in the space corresponding to the characteristic points. The three-dimensional points constitute the objects in the three-dimensional map.

In the three-dimensional map initially constructed using the SLAM/VO method, each object has only a relative scale relative to the world coordinate system, rather than the absolute scale of the target object, i.e., the actual scale of the target object. For example, when the scale is the depth, since the monocular camera cannot provide the absolute depth of points in an image, that is, the true distance from the points to the camera, therefore, the three-dimensional map initially constructed using the SLAM/VO method can only estimate a relative depth and construct the three-dimensional map using the relative depth. For example, when constructing a map by utilizing and normalizing the depth mean value of the three-dimensional points corresponding to the characteristic points as the relative depth, the depth of the objects in the constructed three-dimensional map is only relative to the relative scale of the world coordinate system, i.e., the relative depth, rather than the absolute scale of the object, i.e., the true depth.

Step 102, determining an absolute scale of the target object, and determining a ratio of the relative scale corresponding to the target object to the absolute scale.

In the present embodiment, a ratio of a relative scale of the target object in the three-dimensional map to the absolute scale of the target object (i.e., the actual scale) may be determined, by initially constructing the three-dimensional map using the SLAM/VO method as an example, after initially constructing the three-dimensional map in step 101.

In the present embodiment, the target object in the monocular image may be identified by adopting the convolutional neural network, to obtain the location of the target object in the image and the type of the target object. A plurality of sub-image areas in the image may be selected by performing a selective search utilizing a convolutional neural network for target identifying such as the RCNN (Regions with Convolutional Neural Network). A characteristic such as CNN (Convolutional Neural Network) may be extracted for each of the sub-image areas, and the extracted characteristic may be input into the SVM (Support Vector Machine) classifier trained for different classes to obtain a score of each of the sub-image areas belonging to each of the classes. The majority of the sub-image areas having overlapping areas may be eliminated by using the non-maximum suppression to obtain the type of the target object. When a plurality of target objects are identified, an interactive interface may be presented to the user, and the target object (also referred to as the primary tracking target) for calculating the ratio of the relative scale and the absolute scale is selected by the user through user interaction. In addition, a target object having a preset area may also be selected as the target object for calculating the ratio of the relative scale and the absolute scale.

In some alternative implementations of the present embodiment, a preset scale corresponding to the type of the target object may be used as the absolute scale of the target object. For example, when the target object is a familiar and scale fixed planar object such as a bank card, a bus card, a round coin and a Coke bottle cap, the absolute scale (i.e., actual scale) of the scale fixed object such as a bank card, a bus card, a round coin and a Coke bottle cap may be prestored. After identifying the type of target object, the prestored actual scale corresponding to the target object may be determined. For example, after identifying that the type of the target object is the bus card, the absolute scale of the target object may be determined, since the absolute scale (i.e., actual scale) of the bus card is prestored.

In some alternative implementations of the present embodiment, when the target object is a familiar and scale fixed planar object, the edge of the target object in the image may be detected. For example, when the target object is a rectangular bank card or bus card, the Hough (Hough) Transform may be used to detect the edge of the target object. For another example, when the target object is a flat around object such as a coin, a Coke bottle cap or a manhole cover on the ground, the Hough (Hough) Transform may be used to detect the round and ellipse area of the target object in the image and detect the edge of the target object. For another example, when the target object is a book, the Hough (Hough) Transform may be used to detect the edge of the book in the image and detect the affine quadrilateral corresponding to the surface of the book. After detecting the edge of the target object in the image, the points on the edge of the target object may be selected, and the selected points on the edge of the target object are determined to be correspond to the three-dimensional points in the map initially constructed using the SLAM/VO method. The relative scale corresponding to the target object, that is, the relative scale of the target object in the map initially constructed using the SLAM/VO method, may be determined based on that the points on the edge of the target object correspond to the three-dimensional points in the map initially constructed using the SLAM/VO method. After determining the relative scale corresponding to the target object, the ratio of the relative scale corresponding to the target object to the absolute scale may be determined based on the calculated relative scale corresponding to the target object and the absolute scale of the target object.

For example, when initial constructing the three-dimensional map using the SLAM/VO method with the target object being a rectangular bus card, the Hough transform may be used to detect the edge of the bus card in the image. The four corner points of the bus card are selected as the points on the edge of the bus card. The three-dimensional points in the map initially constructed using the SLAM/VO method corresponding to the four corner points of the bus card may be determined. The relative scale of the bus card may be determined based on the distance between the three-dimensional points, that is, the relative scale of the bus card in the horizontal direction is the length of the long side and the relative scale in the vertical direction is the length of the short side in the map initially constructed using the SLAM/VO method. Since the bus card has a fixed scale and the absolute scales of the bus card in the horizontal direction and the vertical direction (i.e., the actual length of the long side and the actual length of the short side) are prestored, the ratio of the relative scale to the absolute scale may be calculated. When a three-dimensional point corresponding to a point on the edge of the target object does not have three-dimensional information, the absolute scale of the target object may be determined based on the three-dimensional information of the three-dimensional points corresponding to the other points in the area occupied by the target object and a positional relation among the other points in the area occupied by the target object, the points on the edge and the points on the edge of the target object.

In some alternative implementations of the present embodiment, when the target object is a non-planar object, such as a bottled Coca-Cola or a computer, the target object may be reconstructed in a three-dimensional model in advance by utilizing an image containing the target object. In the process of constructing the three-dimensional model of the target object, each of the extracted characteristic points having a characteristic (may also be referred to as a characteristic descriptor) of the target object in the image corresponds to a three-dimensional point in the three-dimensional model, for example, the characteristic is the SIFT (Scale-Invariant Feature Transform) characteristic. Accordingly, the three-dimensional point corresponding to the characteristic point also corresponds to a characteristic. The coordinate of the three-dimensional point in the constructed three-dimensional model of the target object is a coordinate in the world coordinate system.

When the target object is a non-planar object, the profile of the target object in the image may be detected to extract characteristic points having preset characteristics on the profile. For example, the preset characteristic is the SIFT characteristic. When constructing the three-dimensional model of the target object, the characteristic point is also extracted based on the SIFT characteristic, and each of the three-dimensional points in the three-dimensional model also corresponds to a SIFT characteristic. Thus, the SIFT characteristic of the extracted characteristic point of the target object may be matched with the SIFT characteristic of the three-dimensional point in the three-dimensional model to determine the three-dimensional point in the three-dimensional model of the target object corresponding to the extracted characteristic point of the target object. The coordinate of the three-dimensional point in the three-dimensional model of the target object corresponding to the extracted characteristic point of the target object is a coordinate in the world coordinate system. The absolute scale of the target object may be determined based on the coordinate of the three-dimensional point in the three-dimensional model of the target object corresponding to the extracted characteristic point of the target object, such as the actual length or depth of the target object in the horizontal, vertical, and depth directions.

Step 103, adjusting a relative scale of each object in the three-dimensional map, based on the ratio of the relative scale corresponding to the target object to the absolute scale.

In the present embodiment, after determining the ratio of the relative scale corresponding to the target object to an absolute scale in step 102, based on the ratio, the scale of each object in the initially constructed three-dimensional map may be changed to the corresponding absolute scale, i.e., the actual scale, and the scale of each object in the three-dimensional map initially constructed using the SLAM/VO method may be further corrected. This process may also be referred to as the initialization of the SLAM/VO system. The initialization of the SLAM/VO system allows each object in the three-dimensional map to have an absolute scale, after correcting the scale of each object, thereby introducing the absolute scale into the three-dimensional map constructed based on the monocular image. The map construction and locating based on this basis all have the absolute scale, which is equivalent to the construction of the world coordinate system having the absolute scale in the three-dimensional map constructed based on the monocular image.

The purpose of constructing a world coordinate system having the absolute scale is described in an application scenario: after the user turning on the monocular camera of the mobile phone, the multiple frames of images having the parallax may be collected by moving the mobile phone, and after initializing the SLAM/VO system by the above steps 101-103, each object in the three-dimensional map has the absolute scale. Keep moving the mobile phone to collect the image. For example, a frame of image collected later contains both a new object that has never appeared in the three-dimensional map and an object in the three-dimensional map, and an object in the three-dimensional map has an absolute scale in the three-dimensional map obtained after the initialization of the SLAM/VO system. Accordingly, continue to move the mobile phone to collect images, further construct the three-dimensional map after the initialization of the SLAM/VO system using the SLAM/VO method, add the new object to the three-dimensional map, based on the positional relationship between the characteristic point of the new object and the characteristic point of the object in the three-dimensional map, the positional relationship between the three-dimensional point corresponding to the new object in the three-dimensional map and the characteristic point of the object in the three-dimensional map may be determined to further determine the three-dimensional point corresponding to the new object in the three-dimensional map, and the new object in the three-dimensional map is composed of the three-dimensional points. After the SLAM/VO system is initialized, the object in the three-dimensional map has an absolute scale in the three-dimensional map, accordingly, the new object also has an absolute scale in the three-dimensional map. Likewise, each time an image containing a new object is collected, a new object having an absolute scale may be constructed in the three-dimensional map.

Figure 2:
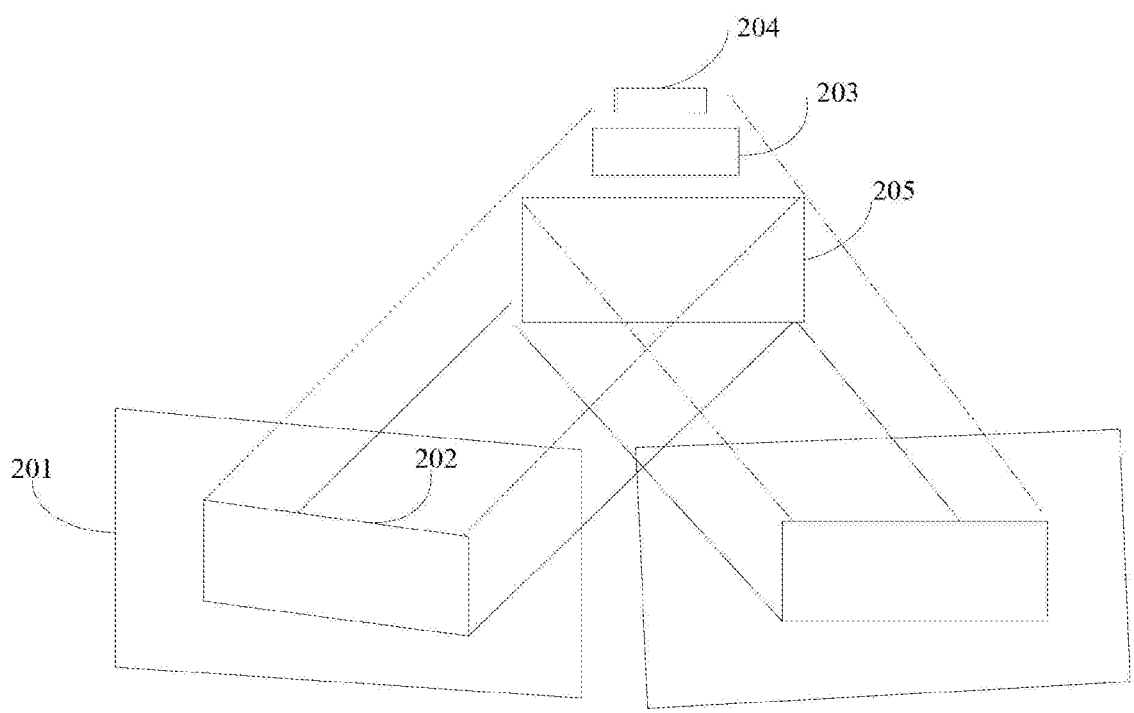
FIG. 2 shows a schematic diagram of the effect of initializing a SLAM/VO system.

Referring to FIG. 2, which shows a schematic diagram of the effect of initializing a SLAM/VO system.

In FIG. 2, a monocular image 201, a bus card 202 in the monocular image, a bus card 203 having an absolute scale, a bus card 204 having a different relative scale and a bus card 205 are shown. When the edge of the bus card is determined, the scale information of the long side and the short side of the bus card is known. When the SLAM/VO system is initialized, the characteristic distribution on the bus card may be found in the constructed three-dimensional map, and the relative scale to the absolute scale in the three-dimensional map obtained by initializing the bus card SLAM/VO system may be corrected, that is, the absolute scale of the monocular camera constructing the map is acquired.

Figure 3:
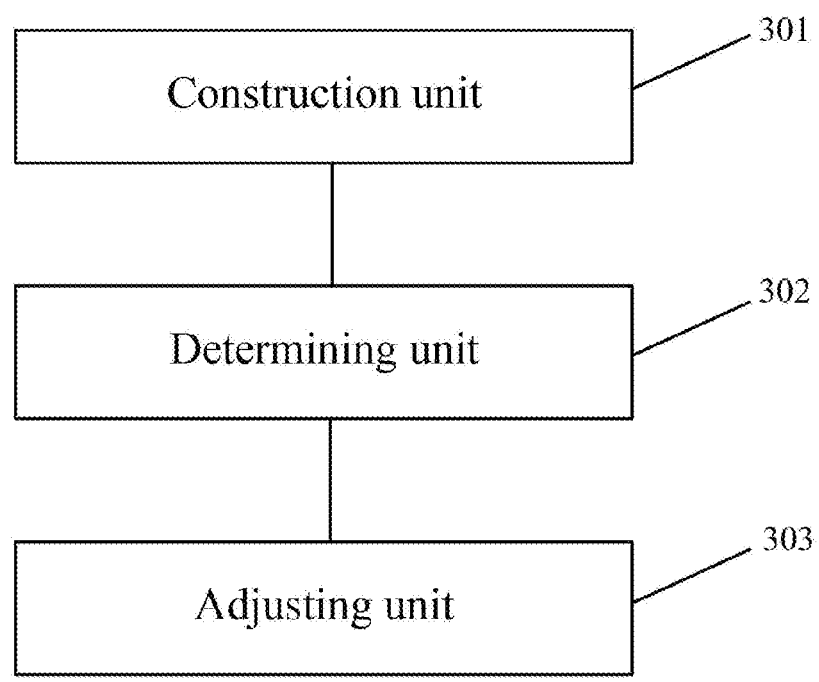
FIG. 3 shows a schematic structural diagram of an embodiment of an apparatus for constructing a three-dimensional map according to the present disclosure.

Referring to FIG. 3, which shows a schematic structural diagram of an embodiment of an apparatus for constructing a three-dimensional map according to the present disclosure. The apparatus embodiment corresponds to the method embodiment shown in FIG. 1.

As shown in FIG. 3, the apparatus for constructing a three-dimensional map of the present embodiment includes: a construction unit 301, a determining unit 302 and an adjusting unit 303. The construction unit 301 is configured to acquire multiple frames of a monocular image containing a target object collected by a monocular camera, and construct a three-dimensional map containing the target object and other objects in the monocular image based on the monocular image, each object in the constructed three-dimensional map corresponding to a relative scale relative to a world coordinate system. The determining unit 302 is configured to determine an absolute scale of the target object, and determine a ratio of the relative scale corresponding to the target object to the absolute scale, the absolute scale being a scale of the target object in the world coordinate system. The adjusting unit 303 is configured to adjust a scale of each object in the three-dimensional map to obtain a three-dimensional map meeting a preset condition, based on the ratio of the relative scale corresponding to the target object to the absolute scale, the preset condition including: the each object in the three-dimensional map having an absolute scale.

In some of the alternative implementations of the present embodiment, the determining unit 302 includes: a first ratio determining subunit (not shown), configured to detect an edge of the target object, select points on the edge, determine a three-dimensional point in the three-dimensional map corresponding to the selected points on the edge, calculate the relative scale corresponding to the target object based on a coordinate of the three-dimensional point, and determine the ratio of the relative scale corresponding to the target object to the absolute scale; and a second ratio determining subunit (not shown), configured to determine a three-dimensional point in the three-dimensional map corresponding to an extracted characteristic point, the extracted characteristic point being a characteristic point having a preset characteristic extracted from a profile of the target object, determine the relative scale corresponding to the target object based on a coordinate of the three-dimensional point in the three-dimensional map corresponding to the characteristic point, and determine the ratio of the relative scale corresponding to the target object to the absolute scale.

The present disclosure also provides a terminal. The terminal may include the apparatus for constructing a three-dimensional map described in FIG. 3. The terminal may be provided with one or more processors, a storage to store one or more programs. The one or more programs may include instructions to perform the operation described in the steps 101-103. When the one or more programs being executed by the one or more processors, cause the one or more processors to perform the operation described in the steps 101-103.

Figure 4:
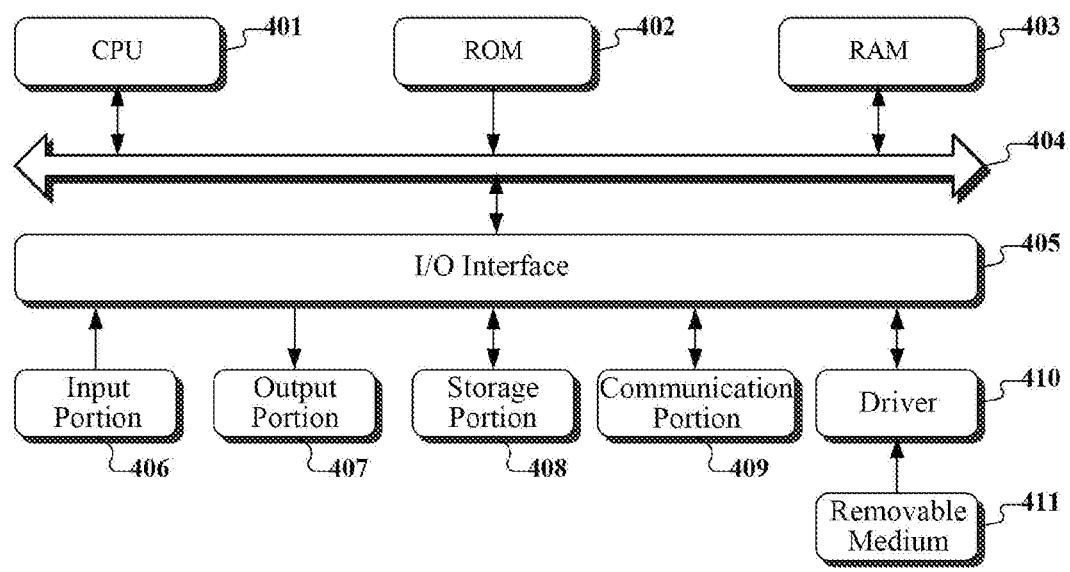
FIG. 4 shows a schematic structural diagram of a terminal adapted to implement the method for constructing a three-dimensional map of embodiments of the present disclosure.

Referring to FIG. 4, a schematic structural diagram of a computer system 400 adapted to implement a server of the embodiments of the present application is shown.

As shown in FIG. 4, the computer system 400 includes a central processing unit (CPU) 401, which may execute various appropriate actions and processes in accordance with a program stored in a read-only memory (ROM) 402 or a program loaded into a random access memory (RAM) 403 from a storage portion 408. The RAM 403 also stores various programs and data required by operations of the system 400. The CPU 401, the ROM 402 and the RAM 403 are connected to each other through a bus 404. An input/output (I/O) interface 405 is also connected to the bus 404.

The following components are connected to the I/O interface 405: an input portion 406 including a keyboard, a mouse etc.; an output portion 407 comprising a cathode ray tube (CRT), a liquid crystal display device (LCD), a speaker etc.; a storage portion 408 including a hard disk and the like; and a communication portion 409 comprising a network interface card, such as a LAN card and a modem. The communication portion 409 performs communication processes via a network, such as the Internet. A driver 410 is also connected to the I/O interface 405 as required. A removable medium 411, such as a magnetic disk, an optical disk, a magneto-optical disk, and a semiconductor memory, may be installed on the driver 410, to facilitate the retrieval of a computer program from the removable medium 411, and the installation thereof on the storage portion 408 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 409, and/or may be installed from the removable media 411.

The present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: acquiring multiple frames of a monocular image containing a target object collected by a monocular camera, and constructing a three-dimensional map containing the target object and other objects in the monocular image based on the monocular image, each object in the constructed three-dimensional map corresponding to a relative scale relative to a world coordinate system; determining an absolute scale of the target object, and determining a ratio of the relative scale corresponding to the target object to the absolute scale, the absolute scale being a scale of the target object in the world coordinate system; and adjusting a scale of each object in the three-dimensional map to obtain a three-dimensional map meeting a preset condition based on the ratio, the preset condition including: the each object in the three-dimensional map having the absolute scale.

It needs to be noted that the computer readable medium in the present disclosure may be computer readable signal medium or computer readable storage medium or a combination thereof. An example of the computer readable storage medium may include but not limited to: systems, apparatus or elements of electric, magnet, optical, electromagnet, infrared ray, or semiconductor or a combination thereof. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or a combination thereof. In the present disclosure, the computer readable storage medium may be any physical medium containing or storing programs which can be used by a command execution system, apparatus or element or the incorporation thereof. In the present disclosure, the computer readable signal medium may include data signal in the base band or propagating as parts of a carrier in which computer readable program codes are carried. The propagated signal may take various forms, include but is not limited to: an electromagnetic signal, an optical signal or a combination thereof. The signal medium that can be read by computer may be any computer readable medium except for the computer readable storage medium. The computer readable medium is capable of transmitting, propagating or transferring programs for used by or used in combination with a command execution system, apparatus or element. The program codes contained on the computer readable medium may be transmitted with any suitable medium including but not limited to: a wireless medium, a wired medium, an optical cable medium, a RF medium and the like, or any combination thereof.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for constructing a three-dimensional map, comprising:

acquiring a plurality of frames of a monocular image containing a target object collected by a monocular camera, and constructing a three-dimensional map containing the target object and other objects in the monocular image based on the monocular image, each object in the constructed three-dimensional map corresponding to a relative scale relative to a world coordinate system;

determining an absolute scale of the target object, and determining a ratio of the relative scale corresponding to the target object to the absolute scale, the absolute scale being an actual scale of the target object in the world coordinate system; and adjusting a scale of each object in the three-dimensional map to obtain a three-dimensional map meeting a preset condition based on the ratio, the preset condition including: the each object in the three-dimensional map having the absolute scale;

wherein when the target object is a planar object, each type of the target object is preset with a corresponding absolute scale, the determining an absolute scale of the target object comprises: identifying a type of the target object, and using an absolute scale preset for the type of the target object as the absolute scale of the target object;

wherein the determining a ratio of the relative scale corresponding to the target object to the absolute scale comprises:

detecting an edge of the target object;

selecting points on the edge;

determining three-dimensional points in the three-dimensional map corresponding to the selected points on the edge;

calculating the relative scale corresponding to the target object based on coordinates of the three-dimensional points; and determining the ratio of the relative scale corresponding to the target object to the absolute scale.

2. The method according to claim 1, wherein when the target object is a non-planar object, before the acquiring the plurality of frames of a monocular image containing a target object collected by a monocular camera, the method further comprises:

performing a three-dimensional model construction for the target object to obtain a three-dimensional model of the target object, based on a characteristic point having a preset characteristic extracted from an image containing the target object, each three-dimensional point in the three-dimensional model having a coordinate in the world coordinate system, and the each three-dimensional point corresponding to a characteristic point and a preset characteristic of the characteristic point.

3. The method according to claim 2, wherein the determining an absolute scale of the target object comprises:
detecting a profile of the target object;
extracting a characteristic point having a preset characteristic on the profile;
determining a three-dimensional point in the three-dimensional model of the target object corresponding to the extracted characteristic point, based on a matching relation between the preset characteristic of the extracted characteristic point and the preset characteristic corresponding to the three-dimensional point in the three-dimensional model of the target object; and
determining the absolute scale of the target object, based on a coordinate of the three-dimensional point in the three-dimensional model of the target object corresponding to the extracted characteristic point.

4. The method according to claim 3, wherein the determining the ratio of the relative scale corresponding to the target object to the absolute scale comprises:
determining a three-dimensional point in the three-dimensional map corresponding to the extracted characteristic point;
determining the relative scale corresponding to the target object, based on the coordinate of the three-dimensional point in the three-dimensional map corresponding to the characteristic point; and
determining the ratio of the relative scale corresponding to the target object to the absolute scale.

5. An apparatus for constructing a three-dimensional map, comprising:
at least one processor; and
a memory storing instructions, which when executed by the at least one processor, cause the at least one processor to perform operations, the operations comprising:
acquiring a plurality of frames of a monocular image containing a target object collected by a monocular camera, and constructing a three-dimensional map containing the target object and other objects in the monocular image based on the monocular image, each object in the constructed three-dimensional map corresponding to a relative scale relative to a world coordinate system;
determining an absolute scale of the target object, and determining a ratio of the relative scale corresponding to the target object to the absolute scale, the absolute scale being an actual scale of the target object in the world coordinate system; and
adjusting a scale of each object in the three-dimensional map to obtain a three-dimensional map meeting a preset condition based on the ratio, the preset condition including: the each object in the three-dimensional map having the absolute scale;
wherein when the target object is a planar object, each type of the target object is preset with a corresponding absolute scale, the determining an absolute scale of the target object comprises: identifying a type of the target object, and using an absolute scale preset for the type of the target object as the absolute scale of the target object;
wherein the determining a ratio of the relative scale corresponding to the target object to the absolute scale comprises:
detecting an edge of the target object;
selecting points on the edge;
determining three-dimensional points in the three-dimensional map corresponding to the selected points on the edge;
calculating the relative scale corresponding to the target object based on coordinates of the three-dimensional points; and
determining the ratio of the relative scale corresponding to the target object to the absolute scale.

6. The apparatus according to claim 5, wherein when the target object is a non-planar object, before acquiring the plurality of frames of a monocular image containing a target object collected by a monocular camera, the operations further comprise:
performing a three-dimensional model construction for the target object to obtain a three-dimensional model of the target object, based on a characteristic point having a preset characteristic extracted from an image containing the target object, each three-dimensional point in the three-dimensional model having a coordinate in the world coordinate system, and the each three-dimensional point corresponding to a characteristic point and a preset characteristic of the characteristic point.

7. The apparatus according to claim 6, wherein the determining an absolute scale of the target object comprises:
detecting a profile of the target object;
extracting a characteristic point having a preset characteristic on the profile;
determining a three-dimensional point in the three-dimensional model of the target object corresponding to the extracted characteristic point, based on a matching relation between the preset characteristic of the extracted characteristic point and the preset characteristic corresponding to the three-dimensional point in the three-dimensional model of the target object; and
determining the absolute scale of the target object, based on a coordinate of the three-dimensional point in the three-dimensional model of the target object corresponding to the extracted characteristic point.

8. The apparatus according to claim 7, wherein the determining the ratio of the relative scale corresponding to the target object to the absolute scale comprises:
determining a three-dimensional point in the three-dimensional map corresponding to the extracted characteristic point;
determining the relative scale corresponding to the target object, based on the coordinate of the three-dimensional point in the three-dimensional map corresponding to the characteristic point; and
determining the ratio of the relative scale corresponding to the target object to the absolute scale.

9. A non-transitory computer readable storage medium, storing a computer program thereon, the computer program, when executed by a processor, cause the processor to perform operations, the operations comprising:
acquiring a plurality of frames of a monocular image containing a target object collected by a monocular camera, and constructing a three-dimensional map containing the target object and other objects in the monocular image based on the monocular image, each object in the constructed three-dimensional map corresponding to a relative scale relative to a world coordinate system;
determining an absolute scale of the target object, and determining a ratio of the relative scale corresponding to the target object to the absolute scale, the absolute scale being an actual scale of the target object in the world coordinate system; and adjusting a scale of each object in the three-dimensional map to obtain a three-dimensional map meeting a preset condition based on the ratio, the preset condition including: the each object in the three-dimensional map having the absolute scale;

wherein when the target object is a planar object, each type of the target object is preset with a corresponding absolute scale, the determining an absolute scale of the target object comprises: identifying a type of the target object, and using an absolute scale preset for the type of the target object as the absolute scale of the target object;

wherein the determining a ratio of the relative scale corresponding to the target object to the absolute scale comprises:

detecting an edge of the target object;

selecting points on the edge;

determining three-dimensional points in the three-dimensional map corresponding to the selected points on the edge;

calculating the relative scale corresponding to the target object based on coordinates of the three-dimensional points; and determining the ratio of the relative scale corresponding to the target object to the absolute scale.

\* \* \* \* \*